Patented Aug. 11, 1931

1,818,576

UNITED STATES PATENT OFFICE

ARTHUR N. PARRETT, OF WILMINGTON, DELAWARE, ASSIGNOR TO E. I. DU PONT DE NEMOURS & COMPANY, OF WILMINGTON, DELAWARE, A CORPORATION OF DELAWARE

RUBBER COATED FABRIC AND PROCESS OF MAKING IT

No Drawing. Application filed February 7, 1930. Serial No. 426,767.

This invention relates to the art of rubber coated fabrics, and more particularly to rubber coated fabrics provided with superposed coatings.

In my co-pending application, Serial No. 228,098, filed October 22, 1927, I have disclosed and claimed rubber coated fabrics provided with successive coatings of pigmented asphalt varnish and pyroxylin drying oil compositions, as well as the process of making such coated fabrics.

I have discovered that improved fabrics can be prepared by using top coatings containing pyroxylin and modified polyhydric alcohol-polybasic acid resins, and that such fabrics are particularly useful when applied over an asphalt varnish undercoat to improve the durability.

By the term "modified polyhydric alcohol-polybasic acid resin", as used herein, I mean the resinous condensation product resulting from the reaction of one or more polyhydric alcohols, one or more polybasic acids, and one or more of the following modifying ingredients: semi-drying oils, semi-drying oil acids, non-drying oils, non-drying oil acids, and menhaden oil, with or without the addition of minor quantities of drying oils, drying oil acids or natural resins, or mixtures of these additional ingredients.

It is therefore an object of this invention to provide a new process of making rubber coated fabrics.

It is another object of this invention to provide new and improved rubber coated fabrics.

With the above and other objects in view, which will be apparent as the description proceeds, I have set forth my invention in the following specification and have included the following examples by way of illustration and not as a limitation:

Example 1

A sheet of fabric is coated with rubber, embossed, and coated with a pigmented asphalt varnish of the following composition:

| | Parts by weight |
|---|---|
| Petroleum asphalt | 100 |
| Carbon black | 25 |
| China wood oil | 120 |
| Xylol | 250 |
| Total | 495 |

The fabric is then heated to vulcanize the rubber and dry the varnish and is then souped with the following composition:

| | Parts by weight |
|---|---|
| Nitrocellulose | 150 |
| Resin A | 450 |
| Iron oxide | 300 |
| Ethyl acetate | 1100 |
| Ethyl alcohol | 650 |
| Butyl acetate | 225 |
| Butyl alcohol | 40 |
| Toluol | 450 |
| Gasoline | 300 |
| Cobalt linoleate | 25 |
| Total | 3690 |

Resin A used in the above composition was prepared by heating 23 parts by weight of glycol with 54 parts by weight of phthalic anhydride and 23 parts by weight of castor oil to the reaction temperature.

Example 2

A sheet of fabric is coated with rubber, embossed, and coated with a pigmented asphalt varnish of the following composition:

| | Parts by weight |
|---|---|
| Petroleum asphalt | 100 |
| Bone black | 50 |
| China wood oil | 80 |
| Gasoline | 125 |
| Turpentine | 125 |
| Total | 480 |

The fabric is then heated to vulcanize the rubber and dry the varnish and is then souped with the following composition:

| | Parts by weight |
|---|---|
| Nitrocellulose | 150 |
| Resin B | 450 |
| Chrome green | 300 |
| Ethyl acetate | 1100 |
| Ethyl alcohol | 650 |
| Butyl acetate | 225 |
| Butyl alcohol | 40 |
| Toluol | 450 |
| Gasoline | 300 |
| Cobalt linoleate | 25 |
| Total | 3690 |

Resin B used in the above composition was prepared by heating 18.01 parts by weight of glycerol with 28.70 parts by weight of phthalic anhydride and 53.29 parts by weight of oleic acid to the reaction temperature.

Although the above examples are limited to the use of glycol and glycerol as the polyhydric alcohol, phthalic anhydride as the polybasic acid, and castor oil and oleic acid as the modifying ingredient, I desire to have it understood that other polyhydric alcohols, polybasic acids and modifying ingredients may be used, such as diglycol, pentaerythrite, succinic acid, maleic acid, various semi-drying and non-drying oils, such as palm oil, corn oil, rapeseed oil, cotton seed oil and soya bean oil, and such acids of semi-drying and non-drying oils as oleic acid and stearic acid. Menhaden oil may also be used.

Also, where desired, minor quantities of drying oils, drying oil acids and natural resins, or mixtures of these, may be incorporated with the reacting ingredients.

Although iron oxide and chrome green have been used in the souping lacquers indicated above, other pigments, such as chrome yellow, antimony, oxide, zinc sulfide and lithopone, or mixtures of pigments, may be used where other colored souping coats are desired.

The solvents used in the souping compositions may be varied provided the resulting solvent mixture is compatible with nitrocellulose and the modified polyhydric alcohol-polybasic acid resin used.

Also, where desired, drying oils, either untreated or blown, may be incorporated with the modified polyhydric alcohol-polybasic acid resins in the formation of the souping compositions.

Likewise, other pigments than carbon black and bone black may be used in the pigmented asphalt coating, although I prefer to use black pigments, including lamp black.

The hydrocarbon solvents used in the pigmented asphalt varnishes are not limited to xylol, gasoline and turpentine as other aromatic and aliphatic solvents, such as toluol, naphtha and kerosene, may be used.

Furthermore, other ratios of pigment and drying oil may be used in the preparation of the pigmented asphalt coatings, although I prefer that these be used in the following ratios:

| | Parts by weight |
|---|---|
| Asphalt | 100 |
| Pigment | 0 to 50 |
| Drying oil | 50 to 100 |

While I prefer to use petroleum asphalt, as I have found that this gives the best results, other asphalt, such as stearin pitch, gilsonite or natural asphalt, may be used, although with somewhat less satisfactory results. The preferred petroleum asphalt is a petroleum residue asphalt having a softening point between 150 and 250° F., as determined by the ball and ring method described in A. S. T. M. Standards 1921, page 944, under the serial designation D–36–21.

The application of the initial rubber coating, the embossing, the vulcanizing, the souping and the subsequent drying may be accomplished in any well known manner.

Rubber coated fabrics prepared as indicated herein have been found to have superior durability and greater gloss retention than similar fabrics finished by previous methods when exposed to atmospheric influences.

It will therefore be apparent that I have developed new and improved rubber coated fabrics, as well as a new and useful process of making them.

As many apparently widely different embodiments of this invention may be made without departing from the spirit and scope thereof, it is to be understood that I do not limit myself to the specific embodiments thereof except as defined in the appended patent claims.

I claim:

1. The process of manufacturing rubber coated fabric which comprises applying a coat of rubber to fabric, embossing, applying a pigmented asphalt varnish thereover, baking to vulcanize the rubber and dry the varnish, and souping with a composition containing pyroxylin, a pigment and a modified polyhydric alcohol-polybasic acid resin.

2. The process of claim 1, in which the asphalt is petroleum asphalt.

3. A coated covering material comprising a fabric base, an embossed vulcanized rubber coating, a layer of baked pigmented asphalt varnish, and a discontinuous coating containing pyroxylin, a pigment, and a modified polyhydric alcohol-polybasic acid resin.

4. The covering material of claim 3, in which the asphalt is petroleum asphalt.

In testimony whereof, I affix my signature.

ARTHUR N. PARRETT.